United States Patent [19]
Nagamatsu

[11] 3,775,556
[45] Nov. 27, 1973

[54] AMPOULE INSPECTOR USING A TELEVISION CAMERA

[76] Inventor: Kazuo Nagamatsu, 6-98, Obayashi-aza-Nishiyama, Takarazuka, Japan

[22] Filed: July 31, 1972

[21] Appl. No.: 276,796

[52] U.S. Cl. ........... 178/6.8, 178/DIG. 37, 356/205, 356/206
[51] Int. Cl. ...... G01n 21/28, H04n 1/38, H04n 7/18
[58] Field of Search ........................ 178/6.8, DIG. 1, 178/DIG. 37; 235/92 PC; 250/52, 83.3 D; 356/204, 205, 206

[56] References Cited
UNITED STATES PATENTS

| | | | |
|---|---|---|---|
| 3,580,997 | 5/1971 | Webb | 178/6.8 |
| 3,598,907 | 8/1971 | Drinkuth | 178/DIG. 1 |
| 3,674,926 | 7/1972 | Dewey | 178/DIG. 37 |

*Primary Examiner*—Howard W. Britton
*Attorney*—E. F. Wenderoth et al.

[57] ABSTRACT

An ampoule inspector using a television camera arranged so as to view at least more than two ampoules continuously transported at a constant speed across the field of view of said camera in equidistantly spaced relation to one another in which discriminating means detects abnormal portions of video signals of said camera corresponding to the defective portions of ampoules to be inspected through respective masks provided by gate means for restricting the scope of the video signals of said camera into respective certain areas corresponding to each of the areas of the ampoules to be inspected and moving to synchronize with the video signals of ampoules transported in the field of view of said camera for a certain time. This ensures an inspection of ampoules which is accurate, precise and quick and extremely suitable for use in mass-production industries.

10 Claims, 11 Drawing Figures

AMPOULE INSPECTOR USING A TELEVISION CAMERA

Figure 1:
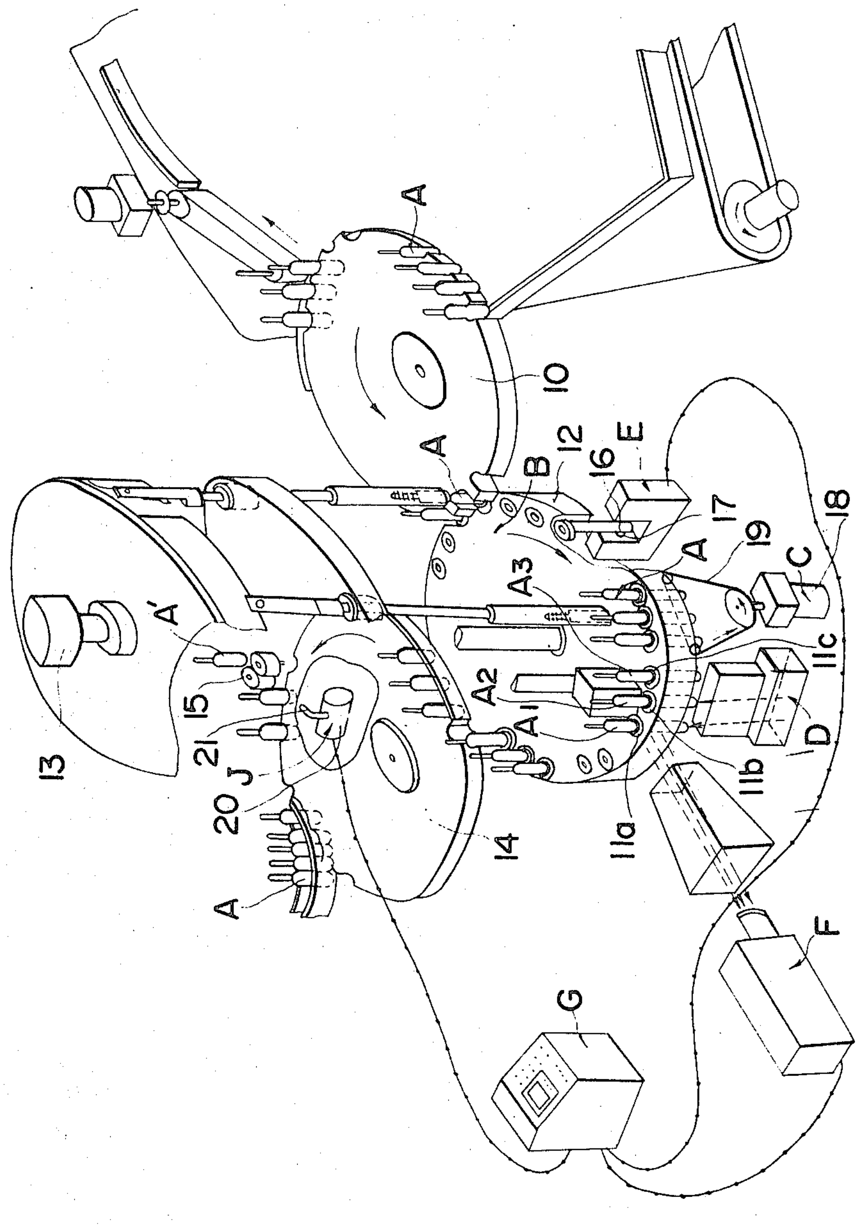

The present invention relates to an ampoule inspector using a television camera and, more particularly, to an ampoule inspector using a television camera arranged so as to shoot at least more than two ampoules continuously transported in a row at constant speed acorss the field of view of said camera in equidistantly spaced relation to one another.

For some time there has been a problem of inspection of ampoules, and similar articles, and the liquid contained in them, for detecting any defects such as foreign matter in the liquid or dirt on the inside of the ampoules, and rejecting the defective article. There are, of course, numerous methods and devices for carrying out such inspection, in one of which a television camera is used to catch optical images of an ampoule passing through the field of view of said camera. However, conventional devices have the disadvantages that since the inspection covers not only the article to be inspected but also a considerable area surrounding the article, particles floating in the air of illumination from other devices can be taken as signs that the article being inspected is defective, and that if two or more articles are inspected together at one time, it is not possible to distinguish between them, and that it is not possible to determine exactly the inspection time for each article, with the result that it is impossible to match the rate of inspection with the rate of production, and also if the inspection is carried out at high speed, they cannot distinguish accurately between the good articles and bad articles, resulting in the rejection of two or three articles instead of only the bad article. Therefore, the disadvantages of these devices are so great that some industries do not use them at all for inspection.

Accordingly, an essential object of the present invention is to provide an ampoule inspector using a television camera capable to eliminate the various disadvantages inherent in the conventional devices, whose operation is accurate, precise and quick, and which is therefore extremely suitabe for use in the mass-production industries.

Another important object of the present invention is provide an ampoule inspector using a television camera which can view more than two ampoules continuously transported at a constant speed in equidistantly spaced relation to one another across its field of view and which can discriminate signals with respect to defective portions of each ampoule individually, disregarding to those of other ampoules, thereby to ensure to accurate distinction between the good ampoules and defective ampoules.

A further object of the present invention is to provide an ampoule inspector using a television camera arranged so as to shoot at least two or more ampoules continuously transported at a constant speed across the field of view of said camera in equidistantly spaced relation to one another in which the discriminating signals with respect to defective portions can be obtained for each ampoule individual by means of a mask provided in the field of view of said camera so as to exclude signals related to an area surrounding the ampoule, whereby accurate and precise inspection of the ampoules is advantageously ensured.

A still further object of the present invention is to provide an ampoule inspector using a television camera of the type above referred to which can be easily manufactured with conventional parts in a compact and durable design, which functions accurately in a trouble free manner to achieve any one of the above various objects of the present invention.

The essential features of the present invention reside in an ampoule inspector using a television camera arranged so as to shoot at least more than two ampoules continuously transported in a row at a constant speed across the field of view of said camera in equidistantly spaced relation to one another which comprises means for discriminating abnormal signals fed from said camera indicative of defective portions of ampoules to be inspected, a plruality of gate means to form masks defining respective certain areas corresponding to inspected areas of ampoules to be inspected and restrict the scope of the video signals of said camera, means for operating said gate means to permit to masks to be synchronized with the video signals of ampoules transported in the field of view of said camera, means for resetting said gate means to return the masks to an initial position in the field of view of said camera, rejecting means operated by the output of said discriminating means to separate each defective ampoule detected by said discriminating means from row of ampoules.

Accordingly in an important embodiment of the present invention, ampoules to be inspected are fed successively into holders in the periphery of a rotating disc so as to pass through the field of view of a television camera at a certain position. Each ampoule is caused to rotate on its own axes and illuminated by a light source during the whole time it is in the field of view of the television camera. The television camera receives the illumination of this light source through reflection from ampoules in its field of vision; the intensity of this reflected light is normally uniform, but if there is any defect, such as foreign matter in the ampoule reflecting the light there is a stronger beam corresponding to the defective part. Electric signals corresponding to all the reflected illumination received by the television camera are sent to a device, which on reciept of a signal corresponding to a stronger beam of reflected light caused by a defect in the article being inspected, sends out a signal to energize a relay which actuates a bar or other means for rejecting the defective article; there is the necessary circuitry for causing the actuation of the rejector to be delayed until the defective article detected comes into line with it. In the case of inspection of two articles simultaneously, the television is equipped with two tracking masks and the field of view of the television camera is large enough to cover two articles to be inspected. as two articles move across the field of view of the television camera, the leading article is tracked by the first mask and the following article by the second mask, both for a certain distance, after which both masks are quickly moved back to their starting positions, with the result that each article is tracked by each mask in turn. Shift registors are provided to delay the signal from the first mask and to cause the signals of both masks to be received at the same time by the receive-transmitter device for energizing the relay actuating the rejector. The receiver-transmitter device is equipped to receive and distinguish two sets of signals separately and thus an article is rejected if it is defective. This is the operation for examining articles two at a time, which already offers advantageous over conventional device, as by masking of the area surrounding the articles being inspected it ensures that only defective articles are rejected; even when many articles are inspected simultaneously each article is distinguished and in this case also only defective articles are rejected; also because of the accurate tracking of each article it is possible to determine exactly the time of inspection of each article which presents great advantages in mass-production. Thus the device achieves the objective of providing an inspection and defect-detection device whose operation is accurate, precise and quick.

Figure 2:
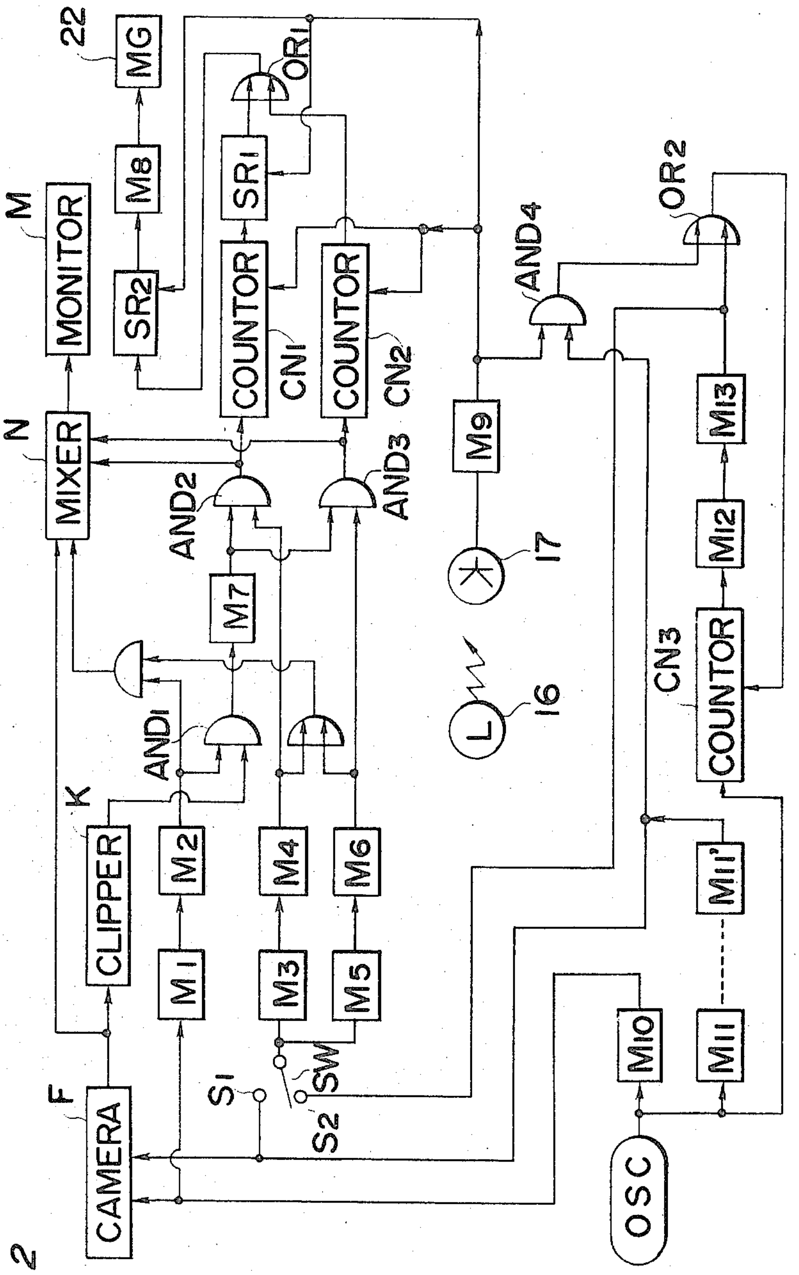
Figure 3A:
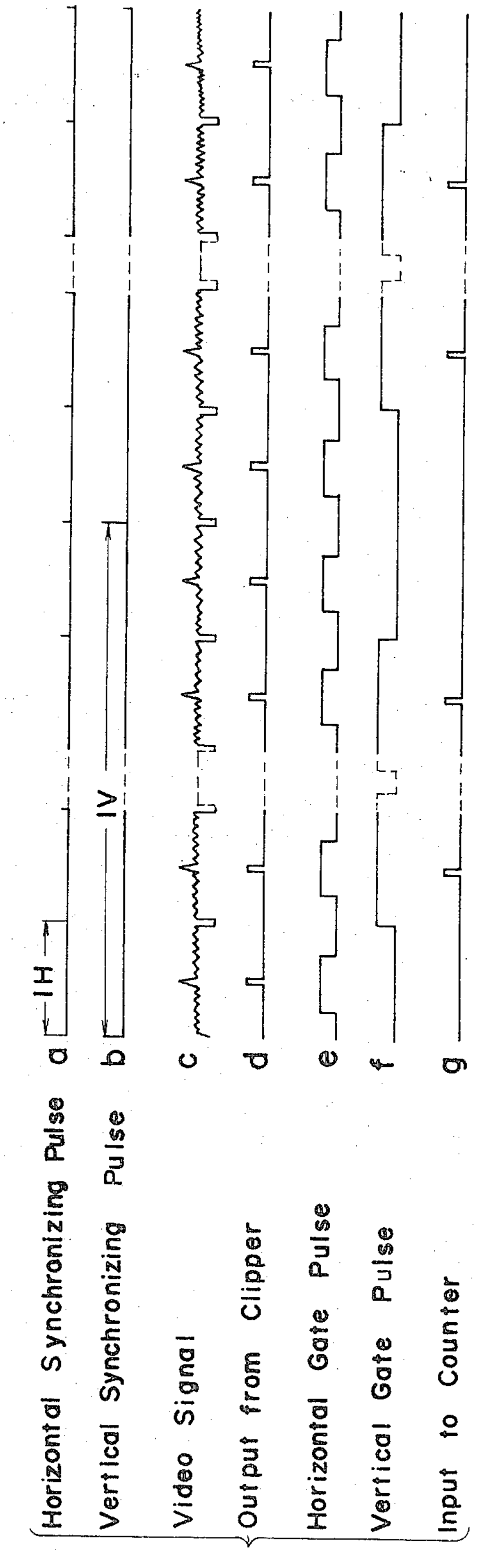
Figure 3B:
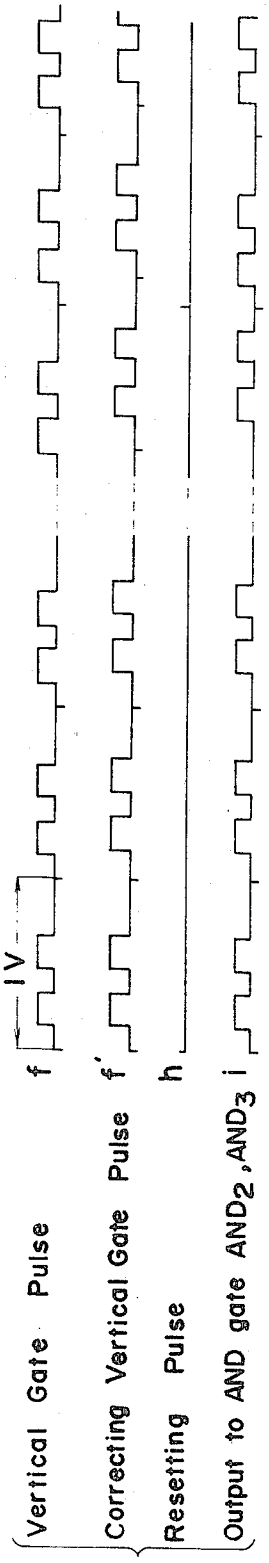
Figure 4A:
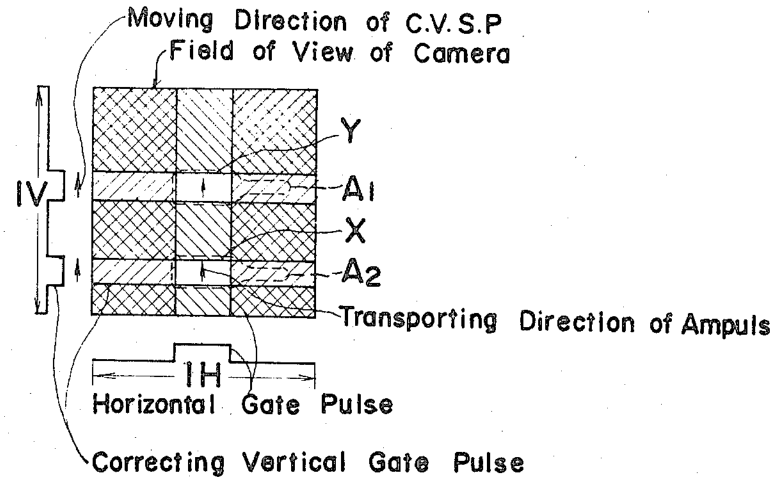
Figure 4B:
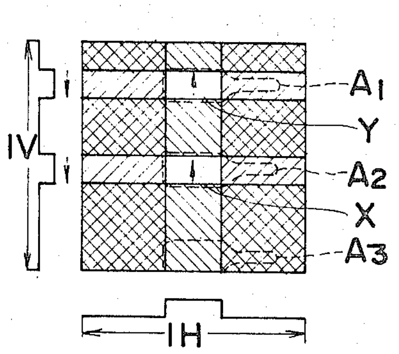
Figure 4C:
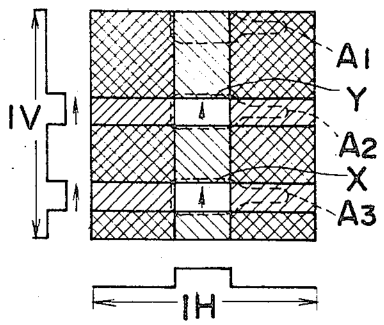
Figure 5:
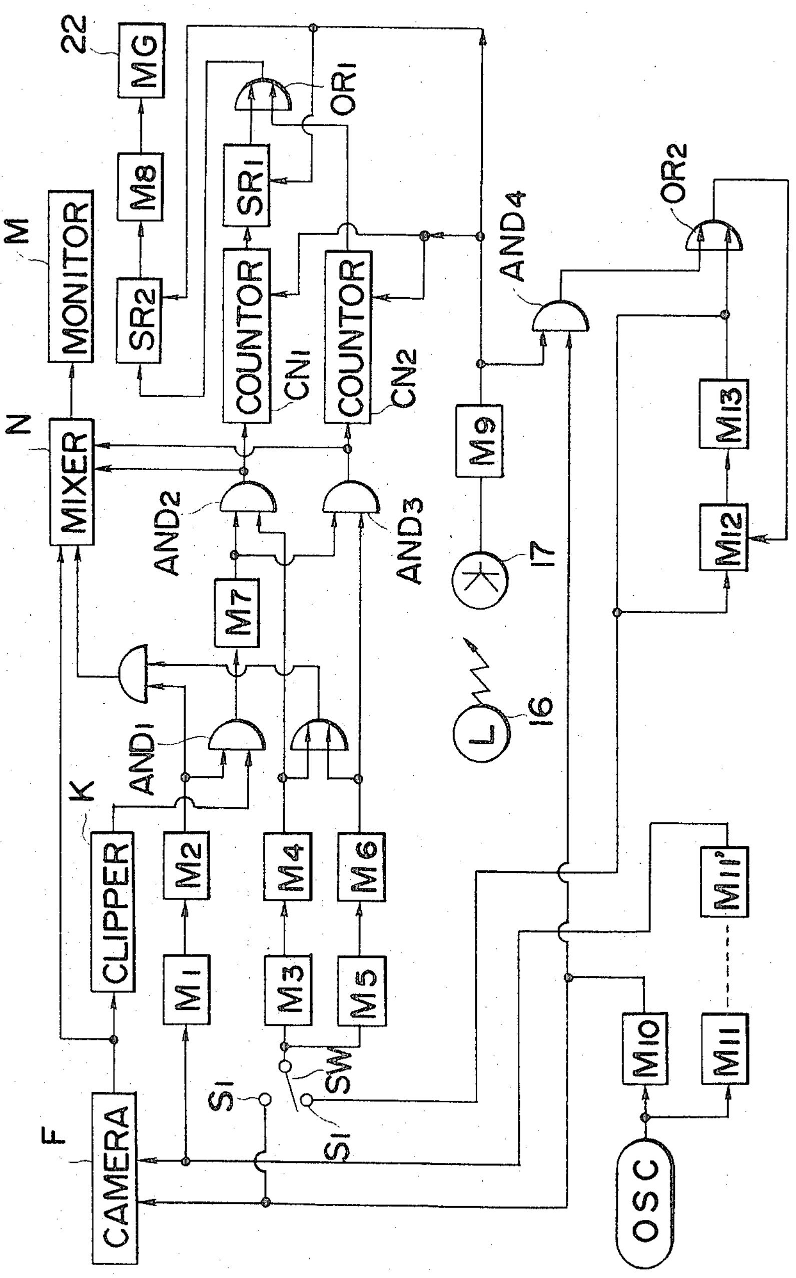
Figure 6:
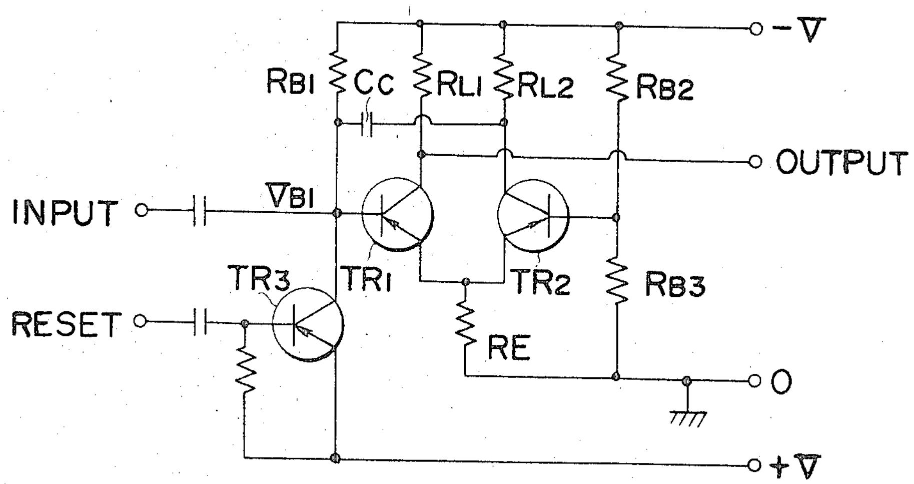
Figure 7:
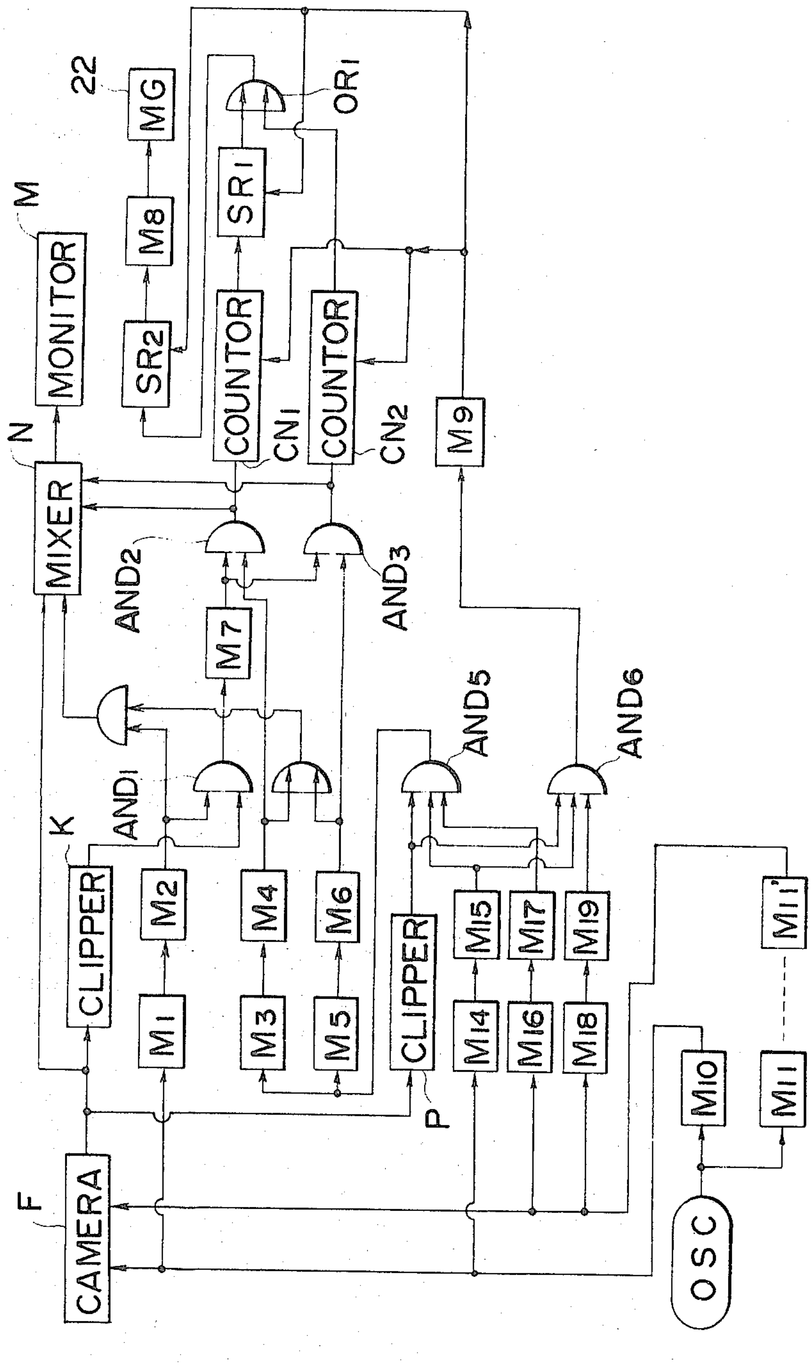
Figure 8:
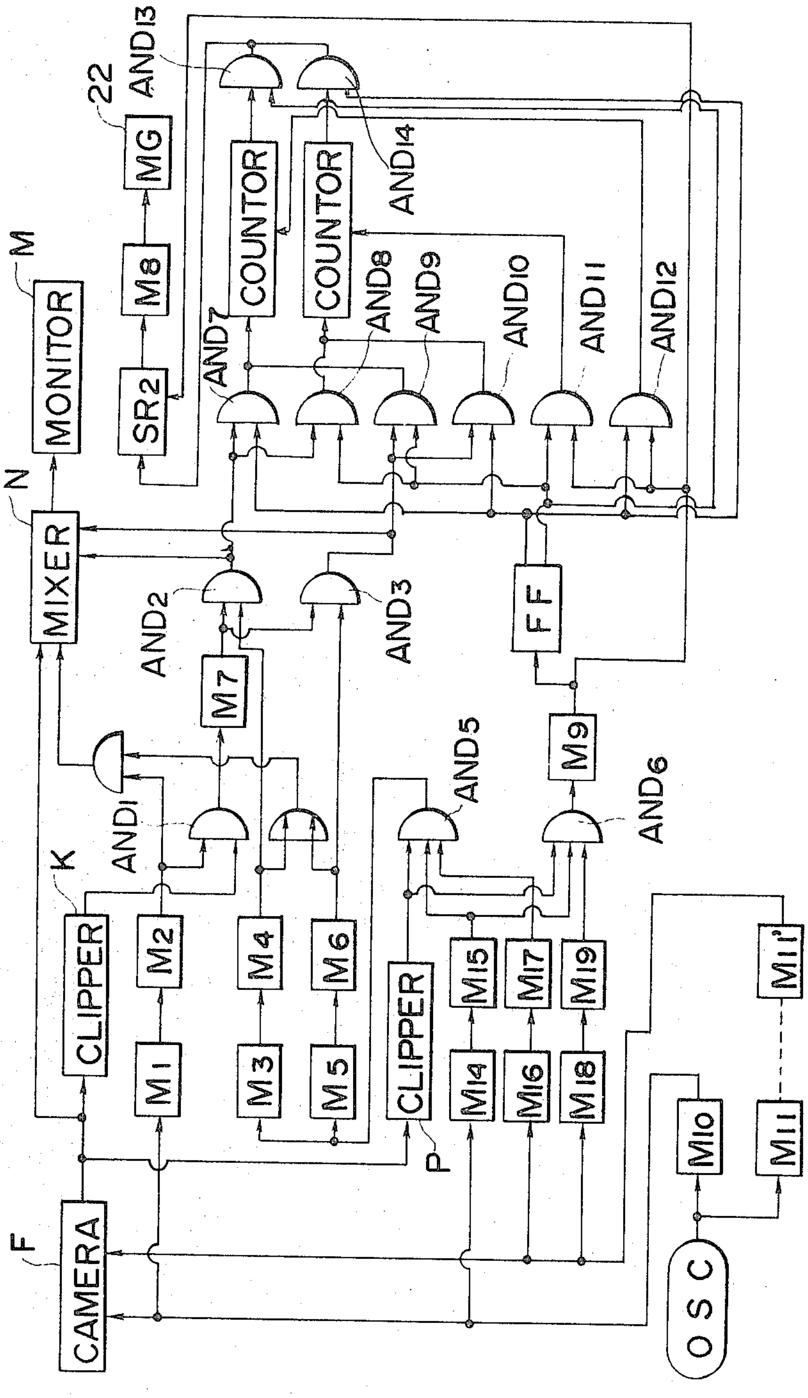

These and other objects and aspects of the present invention will be more clearly understood from the following description of the present invention made with reference to various preferred embodiments thereof shown, by way of example, in the accompanying drawings, in which;

FIG. 1 is a schematic perspective view, partially broken away, of an ampoule inspector showing one preferred embodiment of the present invention, FIG. 2 is an electric block diagram of FIG. 1, FIG. 3, (A) and (B), is a pulse diagram showing the signals occurring in the block diagram of FIG. 2, FIG. 4, (A), (B) and (C), is a schematic diagram showing a field of view of the camera in connection with FIG. 1 for illustrating moving gate pulses, FIG. 5 is an electric circuit block diagram showing another embodiment of FIG. 2, FIG. 6 is an electric circuit block diagram of a part in FIG. 5, FIG. 7 is an electric circuit block diagram showing a further embodiment of FIG. 2, and FIG. 8 is an electric circuit block diagram showing a still further embodiment of FIG. 2.

Before the description of the present invention proceeds, it is to be noted like parts are designated by like reference numerals throughout the several views of the accompanying drawings. It is further to be noted that, for better understanding of the present invention, the description thereof will be hereinafter made in conjunction with an ampoule inspector using a television camera arranged so as to shoot each pair ampoules continuously transported across the field of view of said camera in equidistantly spaced relation to one another. A basic construction and operation of an ampoule inspector to which the present invention can be applicable will be first described with reference to FIG. 1.

An ampoule inspector as shown in FIG. 1 comprises means B for transporting ampoules A in equidistantly spaced relation to one another at a constant speed in one direction, means C for rotating ampoules A about their vertical axes at high speed during transportation thereof, means D for illuminating ampoules A from a certain direction during rotation thereof, means E for detecting the position of an ampoule A to be inspected, at least one television camera F for scanning optical images of at least two or more ampoules A for the inspection during illumination and for converting the images into electrical signals including video signals S, horizontal synchronizing pulses H and vertical synchronizing pulses V, circuit means G for controlling the electrical signals from the television camera F so as to analyze the signal to find out a defective ampoule A', and means J for rejecting a defective ampoule A' detected by the inspection of the television camera F, the rejecting means J being operated by the output of the circuit means G. The transporting means A includes means 10 for continuously feeding ampoules A one by one from a reserve to a first stand 11*a* of a rotary disc 12 rotated by a motor 13 at a constant speed in the clockwise direction and having a plurality of rotatable stands 11*a*, 11*b*, 11*c*, . . . , 11*z* for keeping ampoules $A_1$, $A_2$, $A_3$, . . . spaced equidistantly round its periphery, means 14 for continuously receiving ampoules A from the last stand of the rotary disc 12 one by one and means 15 for collecting defective ampoules A' from the receiving means 14. Around the rotating disc 12, the detecting means C, illuminating means D, and television camera F are arranged suitably spaced and in a suitable order so as to either contact with or face to an ampoule or ampoules rotating with the rotary disc 12 while the rejecting means J is provided at a point between the receiving means 14 and collecting means 15. The detecting means E includes a lamp 16 mounted on the upper front surface of each stand 11 and a photo tube 17 provided in a certain position so as to catch a beam from the lamp of the stand to detect the position of an ampoule to be inspected by the television camera F. The rotating means C includes a motor 18 and an interlocking member 19 driven by the motor 18 and detachably engaging with the lower portion of one or more of stands 11 so as to rotate at high speed ampoules about their vertical axes during inspection by the television camera F, in which condition all defective portions and contents of the ampoule A can reflect toward the television camera F strong beams caused by illumination of the ampoule A by parallel light generated from the illuminating means D. The television camera F is able to scan simultaneously at least two or more rotating ampoules A passing acorss the front of its camera tube to produce optical images of the ampoules A and to catch strong beams contents caused by the illuminating means D. The rejecting means J includes an electromagnetic relay 20 which is operated by an output of the circuit means G connected with the television camera F and a bar member 21 for pushing out a defective ampoule A' in accordance with operation of an electromagnetic relay 22. In this arrangement, the television camera F catches optical images of at least two or more ampoules A within the camera tube, all of which are continuously transported in a row in one direction at equal speed by the transporting means B, and are rotated around their vertical axes at high speed by the rotating means C, and illuminated at their front surfaces by the illuminating means D, and generate the optical image signals which are converted to the electrical signals converted to feed to the circuit means G. The rejecting means J is operated to separate a defective ampoule A' from a good ampoule by an output of the circuit means G in which the electrical signals of the television camera F are analyzed so as to find out the defective ampoul A'.

Referring now to FIG. 2, a block circuit diagram of the circuit means in one preferred embodiment is shown, in which each of the circuit components is represented by a corresponding block symbol which is composed of conventional electric elements as described hereinafter. In this arrangement there is provided a camera tube F for converting the optical images into video signals A and an oscilator OSC for generating both horizontal synchronising pulses H and vertical synchronzing pulses V of constant frequencies, as shown in FIG. 3 a and b, which are in turn fed to the camera tube F in a known amnner. The camera tube F, which is in the form of a conventional vidicon camera, has, for exmple, a field of view covering two or more ampoules in the vertical direction and corresponding to the size of the ampoule in the horizontal direction, as shown in FIG. 4. The oscillator OSC is formed with a conventional quarts crystal oscillator and produces successive oscillations at a constant frequency, for example, a frequency of 105 KHZ. The output of the oscillator OSC is arranged to give horizontal synchronzing pulses H having, for example, a frequency of 15,750 HZ, of the camera tube F through a monostable-multivibrator $M_{10}$ and also vertical synchronizing pulses V having, for example, a frequency of 60 HZ, through a plurality of monostable-multivibrators $M_{11}$, . . . , and $M_{11}'$, as shown in FIG. 3 *a* and *b*. The synchronizing pulses H and V are respectively supplied to a horizontal gate circuit and a vertical gate circuit to synchronize the masking operation of these circuits with the video signal S from the camera tube F. Receiving both the synchronizing pulses H and V from the oscillator OSC, the camera tube F generates the video signals S which convey the intelligence present in the image, together with both the synchronizing pulses H and V, as shown in FIG. 3 *c*. The video signals S transitory includes an abnormal portion of higher voltage than the standard voltage of the video signal, which is generated by receipt of the strong beams of reflected light indicative of a defective portion or content of the ampoule. In other words, the video signal S detect all defective ampoules with a higher voltage portion, since defective portions or contents of the ampoules are reflected with strong beams of light and are rotated to face to the lens of the camera tube F. The higher voltage portions corresponding to high-light pulses of the video signal S are discriminated by a schmidt circuit or clipper K in which an output pulse of constant amplitude exists only so long as the input voltage exceeds a predetermined value, as shown in FIG. 3 *d*. However, these outputs of the clipper K include the higher voltage portions indicative of an ampoule defect and the voltages corresponding to ampouls without defects since the camera tube F catches everything present in the field of view. Therefore, in order to detect exactly the defective ampoules, it is necessary to limit the scope of the video signals S to the area corresponding to the ampoules by means of the gate circuit applied to obtain a masking operation. In the horizontal gate circuit, the horizontal synchronizing pulses supplied from the oscillator OSC are utilized to generate the horizontal gate pulses, as shown in FIG. 3 *e* through a pair of monostable-multivibrators $M_1$ and $M_2$, each of which is raised after the lapse of a certain time defined by one $M_1$ of monostable-multivibrators from decay of the corresponding horizontal synchronizing pulse and has a finite pulse duration defined by the other monostable-multivibrator $M_2$ in a known manner, as shown in FIG. 3 *e*. The pulse duration of the horizontal gate pulses in one scanning field line of the video signal S in the horizontal direction corresponds, as shown in FIG. 4 (A), to th height from any standard point, such as the bottom sides, of the ampoules transported to the vertical direction of the camera tube F, which corresponds to the rising time of the horizontal gate pulses, so that the horizontal gate pulses can eliminate both side portions of the video signals S corresponding to the outsides of the size of ampoules A to be inspected, as a gating or masking operation. Also, in the vertical gate circuit, the vertical synchronozing pulses V, as shown in FIG. 3 *f*, directly supplied from the oscillator OSC through a switch SW in one position $S_1$ are converted into a pair of vertical gate pulses through a pair of monostable-multivibrators, either $M_3$ and $M_4$ or $M_5$ and $M_6$, each pulse being emitted after the lapse of a certain time, defined by one of monostable-multivibrator $M_3$ or $M_5$, after the decay of the preceding verticll synchronizing pulse V and having a finite pulse duration defined by the other monostable-multivibrators $M_4$ and $M_6$ in a known manner, while the pulses of one pair of the monostable-multivibrators $M_3$ and $M_4$ are applied to a first ampoule $A_1$, appearing first in the field of view of the camera tube F, and those of the other pair of the monostable-multivibrators $M_5$ and $M_6$ are supplied to a second ampoule $A_2$ appearing at a certain interval after the first ampoule $A_1$, as shown in FIG. 4 (A). The pulse duration of each pair of vertical gate pulses in the scanning width of the video signal including a great number of scanning field lines in the vertical direction corresponds to the width from a standard point such as an end side of the corresponding ampoules transported vertically with respect to the camere tube F, to which the rising time of the corresponding vertical gate pulses corresponds, so that the vertical gate pulse can completely eliminate the video signal corresponding to both between and outside the pair of ampoules being inspected, as a gating or masking operation, as shown in FIG. 4 (A). Accordingly, the output of the clipper K as shown in FIG. 3 g is limited to signals corresponding to the area of the first ampoule $A_1$ through both the horizontal gate pulses of the monostable-multivibrators $M_1$ and $M_2$ and vertical gate pulses of the monostable-multivibrators $M_3$ and $M_4$ by means of corresponding AND gate $AND_1$ and $AND_2$, and also limited to signals corresponding to the area of the second ampoule $A_2$ through both the horizontal gate pulses of the monostable-multivibrators $M_1$ and $M_2$ and vertical gate pulses of the monostable-multivibrators $M_5$ and $M_6$ by means of corresponding AND gate $AND_1$ and $AND_3$, the output of AND gate $AND_2$ being in turn supplied to a first counter $CN_1$ and the output of AND gate $AND_3$ being in turn supplied to a second counter $CN_2$. Between the AND gate $AND_1$ and AND gates $AND_2$ and $AND_3$ there is provided a monostable-multivibrator $M_7$ for shaping the outputs of the clipper K into standard pulses which can easily be detected by a monitor Braun tube M connected with a mixer N of which the input can be selected from outputs of the camera tube F, AND gates $AND_1$, $AND_2$ and $AND_3$, and monostable-multivibrators $M_4$ and $M_6$.

From the foregoing description, it is to be noted that the defective portions or contents of each ampoule discriminated by the clipper K can be detected by the corresponding counter $CN_1$ or $CN_2$ which counts the number of pulses generated in accordance with signals of the defective portions of the ampoules A' or contents thereof. However, in the foregoing description it is assumed that both of the gate pulses are fixedly placed in one position within the field of view of the camera tube F, though the ampoules are transported across the field of view of the camera tube F in the vertical direction. In other words, one ampoules passes through two masks provided within the field of view of the camera tube F at the same interval as that of two ampoules, as shown in FIG. 4 (A), one of which, that is, a first mask X, consists of an area surrounded by the horizontal gate pulses of monostable-multicibrators $M_1$ and $M_2$ and the vertical gate pulses of monostable-multivibrators $M_3$ and $M_4$ while the other of which, that is, a second mask Y, consists of an area surrounded by the horizontal gate pulses of monostable-multivibrators $M_1$ and $M_2$ and the vertical gate pulses of monostable-multivibrators $M_5$ and $M_6$, so that one ampoule can be inspected twice, each time having a constant period and a constant interval with respect to the other, by means of the two masks X and Y. Both counters $CN_1$ and $CN_2$ generate an output only when they count a number of pulses supplied from the corresponding AND gates $AND_2$ and $AND_3$ in excess of a constant value predetermined for selecting defective ampoules from good ampoules while, for example, the first counter $CN_1$ counts the number corresponding to the first ampoule $A_1$ and the second counter $CN_2$ counts the number corresponding to the second ampoule $A_2$. The output of the first counter $CN_1$ corresponding to the to one ampoule is stored in a first shift registor $SR_1$ until the second counter $CN_2$ generates the output pulse corresponding to the same ampoule transferred from the first mask X to the second mask Y, so that an OR gate $OR_1$ connected with both the first shift registor $SR_1$ and the second counter $CN_2$ supplies the output pulses generated from both counters $CN_1$ and $CN_2$ corresponding to one ampoule to a second shift registor $SR_2$ of which the output is, in turn, supplied to the electromagnetic relay 22 of the rejecting means J through a monostable-multivibrator $M_8$. The second shift registor $SR_2$ is provided for storing the output of the OR gate $OR_1$ for a certain period of time which corresponds to the time necessary to transport the ampoule from the second mask Y to a position near the rejecting means $J_1$ and the monostable-multivibrator $M_8$ is provided for shaping the outputs of the second shift registor $SR_2$ into standard pulses capable of easily operating hte electromagnetic relay 22 of the rejecting means J. Accordingly, the defective ampoule is separated by the operation of the rejecting means J which is actuated by the output of the monostable-multivibrator $M_8$ in the circuit means G.

Though the arrangement described hereinbefore is limited to the range in which the inspection of an ampoule is carried out for a constant time that the ampoule passes through the two masks each fixed at one position within the field of view of camere tube F, in order to precisely inspect the ampoule during the time necessary to move the vertical gate pulses to follw the ampoule transported from a certain standard position in the camera tube F for a certain time. For moving the vertical gate pulses, it is necessary to provide a correcting circuit for the vertical synchronizing pulses and a shifting for either setting or resetting both the counters $CN_1$ and $CN_2$, and the correcting circuit. The shifting circuit includes the lamp 16 and the stand 11 on which an ampoule is kept, the photo tube 17 provided in the fixed position for receiving a beam of light from the lamp 16 so as to detect the standard position of the ampoule within the field of view of the camera tube F, and a monostable-multivibrator $M_9$ for shaping the output of the photo tube 17, the output of the monostable-multivibrator $M_9$ being in turn supplied to both of the counters $CN_1$ and $CN_2$, and the shift registors $SR_1$ and $SR_2$ as a resetting pulse, as shown in FIG. 3 *h*. Each time the photo tube 17 catches the beam of light passing through the ampoule first appearing in the field of view of the camera tube F at the standard position, both of the counters $CN_1$ and $CN_2$ are reset to their respective initial positions by the output of the photo tube 17 while both of the shift registors $SR_1$ and $SR_2$ simultaneously shift the respective outputs to the corresponding next stages of the OR gate $OR_1$ and monostable-multivibrator $M_8$, respectively. On the other hand, the correcting circuit applies the correcting vertical synchronizing pulses to the switch $SW_1$ in the other position $S_2$ connected with both of the monostable-multivibrators $M_3$ and $M_5$ through a counter $CN_3$ and a pair of monostable-multivibrators $M_{12}$ and $M_{13}$. The correcting vertical synchronizing pulse intervals are in a fixed relation to the vertical synchronizing pulse intervals of the monostable-multivibrator $M_{11}$, . . . , and $M_{11}'$ and this relation can be changed, corresponding to changes in the speed of transportation of the ampoules in one direction, so that the correcting vertical gate pulses with which the vertical synchronizing pulses align through the switch $SW_1$ in the position $S_2$ and the gate circuit are, as shown in FIG. 3 *f*, are delayed to move relative to the vertical direction of the field of view of the camera tube F at the same speed as that of transportation of the ampoule since each rising time of the correcting vertical gate pulses defined by the monostable-multivibrator $M_3$ or $M_5$ is delayed one pulse by one pulse at a constant rate in accordance with the correcting vertical synchronizing pulses while the pulse duration defined by the monostable-multivibrator $M_4$ or $M_6$ is constant irrespective of the correcting vertical synchronizing pulses. In the correcting circuit, the counter $CN_3$ and the monostable-multivibrator $M_{12}$ align the correcting vertical synchronizing pulses in a known manner and the monostable-multivibrator $M_{13}$ shapes the pulse form of the correcting vertical synchronizing pulses. It is to be noted that the correcting vertical synchronizing pulses are reset from the instant position to the initial position coinciding with the corresponding vertical synchronizing pulses by the output of the monostable-multivibrator $M_9$ and the monostable-multivibrator $M_{11}'$ through an AND gate $AND_4$ and an OR gate $OR_2$ connected with the AND gate $AND_4$ and the monostabel-multivibrator $M_{13}$, so that the correcting vertical gate pulses come back to coincide with that of the vertical gate pulse each time the output of the monostable-multivibrator $M_9$ is supplied to the AND gate $AND_4$ and, then, move again one pulse by one pulse in accordance with the correcting vertical synchronizing pulses. Accordingly, the vertical gate pulses of two kinds follow the corresponding ampoules transported at a constant speed in one direction and, at the same time, the counters $CN_1$ and $CN_2$ count the number of the defective portions of the respective ampoules, but, when the next ampoule $A_3$ appearing in the field of view of the camera tube F is detected by the photo tube 17 after a certain period, both of the vertical gate pulses return, as shown in FIG. 3 i and FIG. 4 (C), to the initial position at which the second and third ampoules $A_2$ and $A_3$ can be detected in place of the first and second ampoules $A_1$, and $A_2$ and both counters $CN_1$ and $CN_2$ are simultaneously reset and the outputs of both shift registors $SR_1$ and $SR_2$ are shifted. Therefore, each of the ampoules can be inspected correctly for sufficient time in succession. Also, the defective ampoule can not only be separated by the rejecting means *J*, but also reproduced by the monitor Braun tube M. With this arrangement, if more than two ampoules are desired to be simultaneously inspected within the field of view of the camera tube F, for example, *n* ampoules, it is necessary to provide (n-2) sets of the arrangement comprising a vertical gate circuit of monostable-multivibrators, a counter and a shift register such as a unit of $M_3$, $M_4$, $CN_1$ and $SR_1$ in addition to the equipment of block circuit diagram shown in FIG. 2. Also, there may be provided in parallel a plurality of camera tubes F with gate circuit and clipper in addition to the synchronizing pulse circuits of the oscillator and the driving circuit of the electromagnetic relay 22.

Referring now to FIG. 5 in which a second preferred embodiment of the present invention is shown, the only difference between the first and second embodiments resides in the direction of moving ampoules across the field of view of the camera tube F, and using correcting horizontal synchronizing pulses in place of the correcting vertical synchronizing pulses. In this embodiment, the camera tube is arranged in such a manner that the ampoules pass across the field of view of camera tube F in the horizontal direction, so that it is necessary to provide a gate circuit generating vertical gate pulses of which the pulse duration corresponds to the height of the ampoules to be inspected, and correcting horizontal gate pulses moving to follow the transporting ampoules. The vertical synchronizing pulses are supplied from the monostable-multivibrators $M_{11}$, . . . and $M_{11}'$ to the monostable-multivibrators $M_1$ and $M_2$ of the gate circuit while the horizontal synchronizing pulses are supplied from the monostable-multivibrator $M_{10}$ to the monostable-multivibrators $M_3$, $M_4$ and $M_5$, $M_6$ through the switch SW in one position $S_1$, and the correcting horizontal synchronizing circuit is provided between the oscillator OSC and the switch SW in the other position $S_2$. The correcting horizontal synchronizing circuit comprises a pair of monostable-multivibrators $M_{12}$ and $M_{13}$ of the conventional type capable of being reset upon application of the output of the photo tube 17 thereto through AND gate $AND_4$ and OR gate $OR_2$, the electric circuit of the monostable-multivibrators $M_{12}$ and $M_{13}$ is shown in FIG. 6 in which a transistor $TR_1$ is normally conducting a transistor $TR_2$ is normally non-conducting while, when the positive pulse is applied from the oscillator OSC to the input line, the transistors $TR_1$ and $TR_2$ become non-conducting and conducting respectively and, after discharge of condenser $C_c$, return to their respesctive normal conditions so as to operate as a known monostable-multivibrator, but, if the negative pulse is supplied from the photo tube 11 to the reset line, reset to the opposite condition by conduction of a transistor $TR_3$. In any way, the correcting horizontal synchronizing pulses of this embodiment operates as well as the correcting vertical synchronizing pulses of the first embodiment and, also, the other components function in substantially the same manner as in the first embodiment.

A third preferred embodiment of the present invention will be hereinafter described with reference to FIG. 7. In this embodiment, the detecting means include a clipper circuit for detecting a beam of light trqnsmitted from the lamp 16 across each ampoule by means of the video signal of the camera tube F in place of the photo tube described in the first embodiment. The detecting means comprises a second clipper P for discriminating light from the lamp 16 provided on the stand 11 of the ampoule and gate circuit including a horizontal gate circuit of monostable-multivibrators $M_{14}$ and $M_{15}$, and a vertical gate circuit of monostable-multivibrators $M_{16}$ and $M_{17}$, or $M_{18}$ and $M_{19}$ to make a mask for defining a detecting position of the discriminating light within the field of view of the camera tube F. The video signals of the camera tube F are supplied to the clipper P which discriminates a high voltage portion of the video signals corresponding to the light form the lamp 16 and, then generate the output to an AND gate $AND_5$ gate connected with the gate circuit. Also, the horizontal synchronizing pulses are supplied from the monostable-multivibrator $M_{10}$ to the horizontal gate circuit while the vertical synchronizing pulses are supplied from the monostable-multivibrator $M_{11}'$ to the vertical gate circuit, outputs from both the horizontal and vertical gate circuits being, in turn, supplied to the AND gate $AND_5$ and $AND_6$, respectively. Of a pair of monostable-multivibrators in both the gate circuits, each preceding one acts to define a certain rising time of the respective gate pulse and the succeeding one acts to define a constant pulse duration thereof so that, in the field of view of the camera tube F, a square mask is provided by means of the horizontal gate circuits $M_{14}$ and $M_{15}$ and the vertical gate circuits $M_{16}$ and $M_{17}$, or $M_{18}$ and $M_{19}$. The output of the clipper P, which is limited within the scope of the mask through the gate circuit so as to detect the light of the lamp through the ampoule within a certain position in the field of view of the camera tube F, is supplied to both the monostable-multivibrator $M_9$ through AND gate $AND_6$ and the monostable-multivibrators $M_3$ and $M_5$ of the vertical gate circuit through AND gate $AND_5$ which produces the correcting vertical gate pulses moving to follow the ampoule under transportation in the same manner as that of the first embodiment. One mask formed by the respective outputs from the monostable-multivibrators $M_{14}$ and $M_{15}$, and $M_{18}$ and $M_{19}$ is provided for restricting an output of the clipper P in one position of the field of view of camera tube F so as to obtain a reset pulse which represents a signal from the photo tube 17, while the other mask formed by the respective outputs from the monostable-multivibrators $M_{14}$ and $M_{15}$, and $M_{16}$ and $M_{17}$ is provided for restricting outputs of the clipper P at certain intervals with an enough time before the next pulse is generated in response to the first mask X so as to obtain correcting vertical synchronizing pulses in the same manner as afforded by the correcting circuit of the first embodiment. The other components and operation of this embodiment are substantially the same as those of the first embodiment without the switch SW of the first embodiment.

Referring now to FIG. 8 in which the fourth preferred embodiment of the present invention is shown, the only difference between the third and fourth embodiments resides in a method of collecting the outputs of the counters $CN_1$ and $CN_2$ associated with one ampoule. In this embodiment, the shift resistor $SR_1$ and OR gate $OR_1$ of the third embodiment are replaced by a switching circuit of a flip-flop FF and a plurality of $AND_7$ to $AND_{14}$, whereby each counter $CN_1$ and $CN_2$ counts in succession the respective output pulses of two gate circuits $M_1$, $M_2$ and $M_3$, $M_4$ and $M_1$, $M_2$ and $M_5$, $M_6$ with respect to one ampoule passing through the two masks thereof. The flip-flop FF is alternately switched by the output of the monostable-multivibrator $M_9$ into either one of the two conditions, in one of which conditions the outputs from the flip-flop FF are successively supplied to one set of the AND gates $AND_7$ and $AND_{12}$ connected with one counter $CN_1$, AND gate $AND_{10}$ connected with the counter $CN_2$ and AND gate $AND_{14}$ connected with the shift registor $SR_2$ while in the other condition the outputs from the flip-flop FF are successively supplied to the other set of the AND gate $AND_9$ connected with the counter $CN_1$, AND gates $AND_8$ and $AND_{11}$ connected with the counter $CN_2$ and AND gate $AND_{13}$ connected with the shift registor $SR_2$, both of the AND gates $AND_{11}$ and $AND_{12}$ being provided for supplying the reset pulse from the monostable-multivibrator $M_9$ to the respective counters $CN_1$ and $CN_2$. In one condition of the flip-flop FF the outputs from the AND gates $AND_2$ and $AND_3$ are respectively supplied to the counters $CN_1$ and $CN_2$ through the AND gates $AND_7$ and $AND_{10}$, but in the other condition they are respectively supplied to the opposite counters $CN_1$ and $CN_2$ through the ANd gates $AND_8$ and $AND_9$, so that both of the outputs from the first and second gate circuits of the monostable-multivibrators $M_1$, $M_2$, $M_3$, $M_4$, and $M_1$, $M_2$, $M_5$, $M_6$ with respect to one ampoule can be counted by one corresponding counter in succession, and, then, the output of each counter $CN_1$ and $CN_2$ is supplied to the shift registor $SR_2$ earlier than the flip-flop switched. Even this embodiment of FIG. 8 functions substantially in the same manner as in the foregoing embodiments without any reduction of the performance.

Although the present invention has been fully disclosed in conjunction with the various preferred embodiments thereof. Changes and modifications are apparent to those skilled in the art. For example, if ampoules more than two ampoules, for example, n ampoules are simultaneously inspected within the field of view of the camera tube F in the fourth embodiment of FIG. 8, it is necessary to provide $(n-2)$ sets of the arrangement comprising a vertical gate circuit of monostable-multivibrator, a counter, a flip-flop and set of ANd gates provided among them. In any way, such changes and modifications should be, unless otherwise they depart from the true scope and spirit of the present invention, construed as included therein.

What is claimed is:

1. An ampoule inspector using a television camera arranged so as to shoot at least more than two ampoules continuously transported in a row at a constant speed across the field of view of said camera in equidistantly spaced relation to one another, which comprises means for discriminating abnormal portions of video signals from said camera indicative of defective portions of ampoules to be inspected, a plurality of gate means for restricting the scope of the video signals of said camera to form masks defining respective certain areas corresponding to inspected areas of ampoules to be inspected, means for operating said gate means to permit the masks to be synchronized with the video signals indicative of ampoules transporting in the field of view of said camera, means for resetting said gate means to return the masks to an initial position in the field of view of said camera, and rejecting means operated by the output of said discriminating means to separate each defective ampoule detected by said discriminating means from the row of the ampoules.

2. An ampoule inspector according to claim 1, wherein said discriminating means comprises a clipper.

3. An ampoule inspector according to claim 1, wherein said resetting means includes means for detecting an ampoule to be inspected in a certain position of the field of view of said camera.

4. An ampoule inspector according to claim 1, wherein said gate means comprises horozontal gate pulses and vertical gate pulses, both of which pulse durations correspond, respectively, to the width and length of the inspected square area of an ampoule, and both of said gate operating means and resetting means being adapted to operate only one of said gate pulses corresponding to the direction of ampoule transporting direction.

5. An ampoule inspector according to claim 4, wherein said gate pulses are produced in response to the corresponding synchronizing pulses of video signals from said camera.

6. An ampoules inspector according to claim 4, wherein said gate operating means generates correcting pulses for changing the rising time of each of said gate pulses in succession, and said resetting means generates a resetting pulse for resetting the resing time of said gate pulse to the initial position.

7. An ampoule inspector using a television camera arranged so as to shoot at least two or more ampoules continuously transported in a row at a constant speed across the field of view of said camera in equidistantly spaced relation to one another, which comprises means for discriminating abnormal portions of video signals from said camera indicative of defective portions of ampoules to be inspected, a plurality of gate means each for one ampoule for restricting the scope of video signals of said camera to form masks defining respective certain areas corresponding to inspected areas of the ampoules to be inspected, at least one shift registor for storing the output from the preceding gate means until the succeeding gate means generates the output relating to the ampoule detected by the preceding gate means so that said preceding gate means and succeeding gate means generate their respective outputs at the same time, means for operating said gate means to permit the masks to be synchronized with the video signals indicative of the ampoules transported across the field of view of said camera, means for resetting said gate means to return said masks to an initial position in the field of view of said camera, and rejecting means operated by the output from said shift registor to separate each defective ampoule detected by said discriminating means from the row of the ampoules.

8. An ampoules inspector using a television camera arranged so as to shoot at least more than two ampoules continuously transported in a row at a constant speed across the field of view of said camera in equidistantly spaced relation to one another, which comprises means for discriminating abnormal portions of video signals from said camera indicative of defective portions of ampoules to be inspected, a plurality of gate means each for one ampoule for restricting the scope of video signals of said camera to form masks defining respective certain areas corresponding to inspected areas of the ampoules to be inspected, a a plurality of counters for counting the number of respective output pulses generated from said corresponding gate means, means for operating said gate means to permit the masks to be synchronized with the video signals indicative of the ampoules transported across the field of view of said camera, means for resetting said gate means to return the masks to initial positions in the field of view of said camera, amd rejecting means operated by the output from said counters to separate each defective ampoule detected by said discriminating means from the row of the ampoules.

9. An ampoule inspector using a television camera arranged so as to shoot at least more than two ampoules continuously transported in a row at a constant speed across the field of view of said camera in equidistantly spaced relation to one another, which comprises means for discriminating abnormal portion of video signals from said camera indicative of defective portions of the ampoules to be inspected, a plurality of gate meand each for one ampoule for restricting the scope of video signals of said camera to form masks defining respective certain areas corresponding to inspected areas of the ampoules to be inspected, a plurality of counters each provided for counting the number of the respective output pulses from said corresponding gate means, at least one shift registor for storing the output from the preceding counter until the succeeding counter generates the output relating to the ampoule detected by the preceding counter so that said preceding and succeeding gate means generate their respective outputs at the same time, means for operating said gate means to permit the masks to be synchronized with the video signals indicative of the ampoules transported across the field of view of said camera, means for resseting said gate means to return the masks to initial positions in the field of view of said camera, and rejecting means operated by the output of said shift registor to separate each defective ampoule detected by said discriminating means from the row of the ampoules.

10. An ampoule inspector using a television camera arranged so as to shoot at least more than two ampoules continuously transported in a row at a constant speed across the field of view of said camera in equidistantly spaced relation to one another, which comprises means for discriminating abnormal portions of video signals from said camera indicative of defective portions of the ampoules to be inspected, a plurality of gate means each for one ampoule for restricting the scope of video signals of said camera to form masks defining respective certain areas corresponding to inspected areas of the ampoules to be inspected, a plurality of counters each provided for counting the number of the respective output from said corresponding gate means, at least one switching means for switching said gate means so as to cause a succeeding one of said gate means to generate an output therefrom to a counter which counts the output pulses from the preceding gate means so that the counter counts both of the output pulses relating to one ampoule to be inspected, means for operating said gate means to permit the masks to be synchronized with the video signals indicative of the ampoules transported across the field of view of said camera, means for resetting said gate means to return the masks to initial positions in the field of view of said camera, and rejecting means operated by the output of said counter to separate each defective ampoule detected by said discriminating means from the row of the ampoules.

* * * * *